Figure 1:
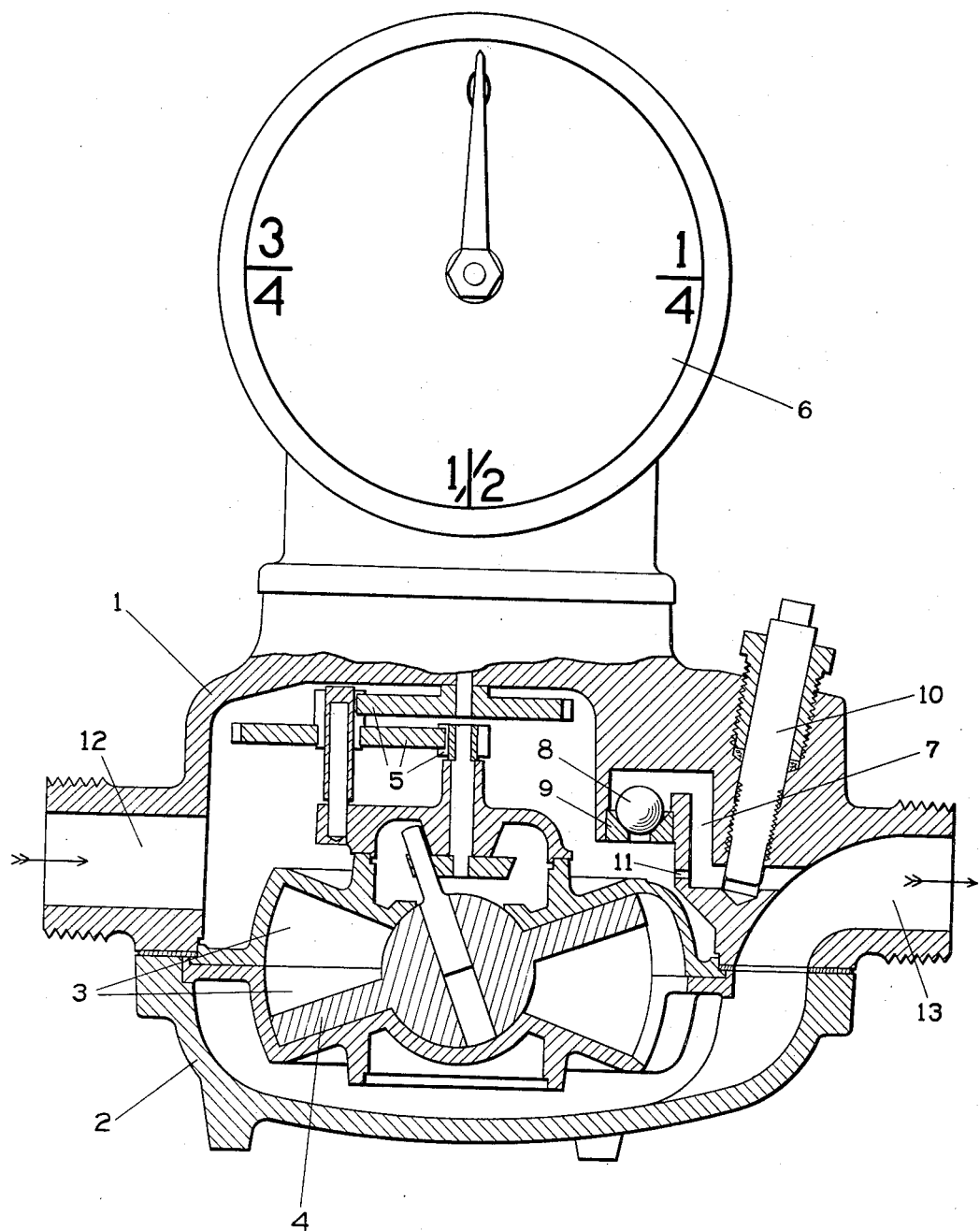

Patented Jan. 2, 1934

1,941,925

UNITED STATES PATENT OFFICE 1,941,925

LIQUID METER

Robert S. Bassett, Buffalo, N. Y.

Application November 20, 1930
Serial No. 496,973

1 Claim. (Cl. 73—98)

My invention relates to improvements in liquid meters in which an indicator is driven by a liquid operated mechanism and more particularly to those in which the working joints of the semi-positive liquid operated mechanism are kept semi-tight by a film of liquid retarded in its passage through said working joints by capillary attraction or what is commonly called liquid packing.

The object of my invention is to provide means to compensate for the variation in leakage through the above mentioned working joints of the liquid operated mechanism, by providing a small compensating by-pass which will pass liquid around the driven member of the liquid operated mechanism to a maximum extent when the flow through said mechanism is so great that there is a considerable differential in pressure existing between the inlet and outlet passages leading to said mechanism, and to a minimum extent when the flow through said mechanism is so small that there is a negligible differential in pressure existing between inlet and outlet passages leading to said mechanism, thereby making the slippage ratio very nearly the same under the two above flow conditions.

At a low rate of flow the leakage past the driven member of the liquid operated mechanism through the working joints is greater in proportion to the total flow than at the higher rates of flow. Inversely, the liquid flowing through the compensating by-pass around the driven member of the liquid operated mechanism is less in proportion to the flow on extremely low rates of flow than it is on higher rates of flow which very nearly offsets the variation in slippage through the working joints.

The compensating by-pass is fitted with a liquid operated automatic throttling device and may also be fitted with a control valve for regulating at one point the cross-sectional area of said by-pass and to provide a non-automatic throttling device for the compensating by-pass in addition to the automatic throttling device. In addition, there may be a branch in the by-pass which is not controlled by the automatic throttling device, though this branch and the non-automatic throttling device are not essential for the successful operation of the automatic throttling device which works independently and has the above additional features for refinement of control.

In the drawing Figure 1 is a central vertical longitudinal view of my improved liquid meter showing the outside of the indicator and showing a section through the meter body through the interior parts as they are placed in the meter body.

The outer casing of the meter is composed of two detachable parts, 1 and 2, which may be held together by conventional means which are not shown. Semipositive liquid operated measuring mechanism 3 is supported within the outer casing of the meter and in the drawing is shown of the well-known nutating disc piston type. 4 is the piston or driven member. Measuring mechanism 3 is operatively connected to indicator 6 by connecting means 5 which is shown as a train of spur gearing of the customary type.

7 is the compensating by-pass around measuring mechanism 3. 8 is the automatic throttling device which is not limited to the exact construction shown but may be any type of throttling device automatically operated by the liquid flowing through the meter. In the construction shown 8 is a ball which is held by gravity against seat 9 and opened automatically by the pressure of the liquid directly beneath it.

10 is a non-automatic throttling device for by-pass 7 and is shown as a needle valve type of valve such as is customarily used to regulate at one point the cross-sectional area of a meter by-pass. 11 is a branch opening from by-pass 7 to permit a partial flow of liquid through the by-pass independent of automatic throttling device 8. Branch opening 11 is shown to indicate that automatic throttling device 8 does not necessarily entirely close by-pass 7 when throttling device 8 is at the position of minimum opening. In some cases it is necessary to permit a small flow through by-pass 7 when the differential of liquid pressures is not sufficient to operate automatic throttling device 8 though in other cases branch opening 11 is not necessary so that it, therefore, is included only as a refinement of the fundamental idea.

12 is the inlet passage and 13 is the outlet passage of the liquid meter. As in all liquid operated measuring devices the pressure in inlet passage 12 must be slightly greater than the pressure in outlet passage 13 so as to create power to drive the liquid operated measuring mechanism. This differential in pressure is very low at low rates of flow through the meter but appreciably higher at higher rates of flow. At the lower rates of flow, therefore, there is a tendency for the liquid to leak through the working joints of piston 4 instead of driving the piston in exact proportion to the liquid flow. On the higher rates of flow the leakage may be approximately the same but because of the higher rate of flow the proportion of the leakage to the rate of flow is very much lower.

In order to compensate for this variation in the proportion of slippage or leakage past the piston I have provided a by-pass with automatic throttling means which will allow a maximum flow through the by-pass at the maximum flow through the liquid meter so as to equalize the ratio of slippage or leakage past the piston as compared with that when the flow is near the minimum. At minimum flows the automatic throttling device practically stops the flow through the compensating by-pass so that the ratio of the sum of the slippage or leakage past the piston plus the flow through the by-pass as compared to the total flow through the meter will approximately remain constant, the by-pass automatically compensating to a very considerable extent for the variation in the ratio of the leakage past the piston alone.

The exact construction of the automatic throttling device is not limited to that shown but may be any liquid operated throttling device, operated by a differential in liquid pressures in two nearby parts of the liquid meter. The throttling device may be located at any suitable point within the meter such as in outlet passage 13 and is not limited to the exact location shown.

Having thus described my invention what I claim as new and desire to secure by Letters of Patent is:

In a meter used to measure liquids at high and low rates of flow, the combination with a semi-positive liquid operated measuring mechanism having inlet and outlet passages, of a by-pass duct connecting said passages around said mechanism and having a restricted inlet opening, a calibrating valve in said by-pass duct whereby the relative rate of flow through said duct as compared with the rate of flow through said mechanism is adjustable, a secondary branch by-pass duct potentially connecting said first by-pass duct at a point ahead of said calibrating valve with said inlet passage and valve means for reducing the capacity of said secondary branch by-pass duct automatically in accordance with reduction through a predetermined range of total flow through said by-pass ducts and said mechanism, substantially as and for the purpose described.

ROBT. S. BASSETT.